(12) United States Patent
Chien et al.

(10) Patent No.: US 9,369,017 B2
(45) Date of Patent: Jun. 14, 2016

(54) FAN AND MOTOR THEREOF

(75) Inventors: Han-En Chien, Taoyuan Hsien (TW);
Meng-Yu Chen, Taoyuan Hsien (TW);
Yen-Chun Huang, Taoyuan Hsien
(TW); Kun-Chou Lee, Taoyuan Hsien
(TW)

(73) Assignee: DELTA ELECTRONICS, INC.,
Taoyuan Hsien (TW)

( * ) Notice: Subject to any disclaimer, the term of this patent is extended or adjusted under 35 U.S.C. 154(b) by 329 days.

(21) Appl. No.: 13/233,370

(22) Filed: Sep. 15, 2011

(65) Prior Publication Data
US 2012/0068581 A1 Mar. 22, 2012

(30) Foreign Application Priority Data

Sep. 21, 2010 (TW) ................................ 99132068 A

(51) Int. Cl.
*H02K 11/00* (2006.01)
*H02K 29/08* (2006.01)
*H02K 1/27* (2006.01)

(52) U.S. Cl.
CPC .............. *H02K 1/2786* (2013.01); *H02K 29/08* (2013.01)

(58) Field of Classification Search
CPC ............................ H02K 29/08; H02K 1/2786
USPC ........ 310/68 B, 67 R, 156.05, 156.26, 156.38
See application file for complete search history.

(56) References Cited

U.S. PATENT DOCUMENTS

| | | | | |
|---|---|---|---|---|
| 4,417,186 A * | 11/1983 | Hirose et al. | ............. | 318/400.41 |
| 4,481,440 A * | 11/1984 | Muller | ........................... | 310/268 |
| 4,734,606 A * | 3/1988 | Hajec | ........................... | 310/90.5 |
| 4,737,674 A * | 4/1988 | Miyao | ........................... | 310/268 |
| 5,089,733 A * | 2/1992 | Fukuoka | ........................... | 310/67 R |
| 5,095,238 A * | 3/1992 | Suzuki et al. | ............. | 310/156.46 |
| 5,654,600 A * | 8/1997 | Nomura et al. | ............. | 310/68 B |
| 5,744,894 A * | 4/1998 | Cho et al. | ............. | 310/156.38 |
| 6,093,984 A * | 7/2000 | Shiga et al. | ............. | 310/26 |
| 6,750,586 B2 * | 6/2004 | Horng et al. | ............. | 310/256 |
| 7,084,540 B2 * | 8/2006 | Brahmavar et al. | ...... | 310/156.38 |
| 7,999,430 B2 * | 8/2011 | Hung | ........................ | 310/156.38 |
| 2004/0061395 A1* | 4/2004 | Abordi et al. | ............. | 310/104 |
| 2008/0084139 A1 | 4/2008 | Schroer et al. | | |
| 2010/0156227 A1* | 6/2010 | Hung | ........................ | 310/156.38 |

FOREIGN PATENT DOCUMENTS

CN 2386570 Y 7/2000
CN 2891454 Y 4/2007

(Continued)

*Primary Examiner* — Alex W Mok
(74) *Attorney, Agent, or Firm* — Kirton McConkie; Evan R. Witt

(57) ABSTRACT

A motor includes a base plate, a stator, a rotor, a circuit board and a Hall element. The stator is disposed on the base plate. The rotor is disposed around the stator, and includes a rotating shaft and a magnetic assembly. The rotating shaft is extended to a center part of the stator. The magnetic assembly includes plural magnets. The circuit board is arranged between the stator and the base plate and comprises a Hall element. A first gap and a second gap are arranged between every two adjacent magnets. The first gap is in the vicinity of the Hall element, and opposed to the second gap. The distance of a vacant portion of the first gap is shorter than the distance of the second gap, thereby facilitating continuous and steady magnetic induction between the Hall element and the magnetic assembly.

9 Claims, 8 Drawing Sheets

(56) References Cited

FOREIGN PATENT DOCUMENTS

| | | | | | |
|---|---|---|---|---|---|
| EP | 549426 | A1 * | 6/1993 | | H02K 1/27 |
| JP | 01081682 | A * | 3/1989 | | |
| JP | 01206859 | A * | 8/1989 | | H02K 21/08 |
| JP | 02036757 | A * | 2/1990 | | |
| JP | 2007151330 | | 6/2007 | | |
| TW | M360947 | | 7/2009 | | |
| TW | M365605 | | 9/2009 | | |

\* cited by examiner

9,369,017 B2

FAN AND MOTOR THEREOF

FIELD OF THE INVENTION

The present invention relates to a motor, and more particularly to a motor of a brushless fan for facilitating a Hall element to sense continuous and steady magnetic induction.

BACKGROUND OF THE INVENTION

With increasing development of science and technology, the demands on heat-dissipating brushless fans become more stringent. For example, the air pressure, airflow capacity or the overall operating efficiency should comply with specified requirements. Conventionally, for reducing the noise of the operating motor of the brushless fan, the magnets of the rotor usually have chamfered edges. Due to the chamfered edges, the cogging torque of the motor is decreased, and the noise generated by the motor is reduced.

A rotor of a motor of a brushless fan is disclosed in for example Taiwanese Utility Model Patent Publication No. M358465, which is entitled "Rotor structure of DC brushless motor". FIG. 1 is a schematic view illustrating a rotor of a brushless motor according to the prior art. As shown in FIG. 1, the rotor 1 includes a silicon steel sheet 10, a shaft 11, plural N-pole magnets 12 and plural S-pole magnets 13. The N-pole magnets 12 and the S-pole magnets 13 are alternately arranged around the silicon steel sheet 10 and discretely arranged at regular intervals d. After the brushless motor is turned on, the whole structure is suffered from the vibration of the brushless motor, and thus corresponding resonance is created. Due to the intervals d between the N-pole magnets 12 and the S-pole magnets 13, the cogging torque of the motor is decreased. In this situation, the operation of the brushless motor becomes more efficient and smoother. In addition, since the resonance is reduced, the noise generated by the motor is reduced.

The intervals d between the N-pole magnets 12 and the S-pole magnets 13, however, may incur some drawbacks. For example, due to the intervals d, the magnetic induction between the Hall element on the circuit board and the magnets 12, 13 is possibly interrupted. The poor magnetic induction results in erroneous judgment and deteriorates the overall performance of the motor.

For avoiding the poor magnetic induction caused by the chamfered edges of the magnets, the conventional motor is additionally equipped with an auxiliary-induction magnetic ring. The additional auxiliary-induction magnetic ring, however, increases the fabricating cost. Moreover, due to the size tolerance between the shaft and the auxiliary-induction magnetic ring or imprecise arrangement, a misalignment problem occurs. Moreover, if the auxiliary-induction magnetic ring is installed, the magnetization procedure should be performed again. In other words, the addition auxiliary-induction magnetic ring increases the fabricating cost and increases the process complexity.

Therefore, there is a need of providing a fan and a motor thereof to obviate the drawbacks encountered from the prior art.

SUMMARY OF THE INVENTION

The present invention provides a motor with reduced cogging torque and reduced noise while increasing the magnetic induction between the Hall element and the magnetic assembly.

The present invention also provides a motor for obviating the problems resulting from the additional auxiliary-induction magnetic ring (e.g. increased fabricating cost, complicated fabricating process and double magnetization procedures).

The present invention further provides a fan with such a motor.

In accordance with an aspect of the present invention, there is provided a motor of a brushless fan. The motor includes a base plate, a stator, a rotor, a circuit board and a Hall element. The stator is disposed on the base plate. The rotor is disposed around the stator, and includes a rotating shaft and a magnetic assembly. The rotating shaft is extended to a center part of the stator. The magnetic assembly includes plural magnets. The circuit board is arranged between the stator and the base plate and includes a Hall element. A first gap and a second gap are arranged between every two adjacent magnets. The first gap is in the vicinity of the Hall element, and opposed to the second gap. The distance of a vacant portion of the first gap is shorter than the distance of the second gap, thereby facilitating continuous and steady magnetic induction between the Hall element and the magnetic assembly.

In accordance with another aspect of the present invention, there is provided a fan. The fan includes a base plate, a stator, a rotor, a circuit board and a Hall element. The stator is disposed on the base plate. The rotor is disposed around the stator, and includes an impeller, a rotating shaft and a magnetic assembly. The rotating shaft is extended to a center part of the stator. The magnetic assembly includes plural magnets. The magnetic assembly and the stator are sheltered by the impeller. The circuit board is arranged between the stator and the base plate and includes a Hall element. A first gap and a second gap are arranged between every two adjacent magnets. The first gap is in the vicinity of the Hall element, and opposed to the second gap. The distance of a vacant portion of the first gap is shorter than the distance of the second gap, thereby facilitating continuous and steady magnetic induction between the Hall element and the magnetic assembly.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
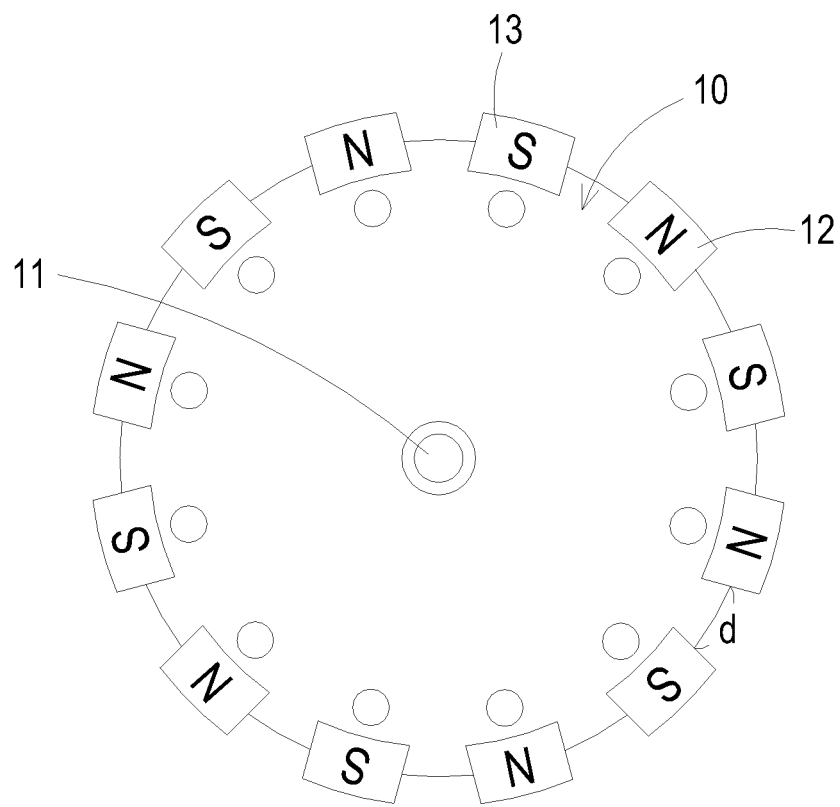
FIG. 1 is a schematic view illustrating a rotor of a brushless motor according to the prior art.
Figure 2A:
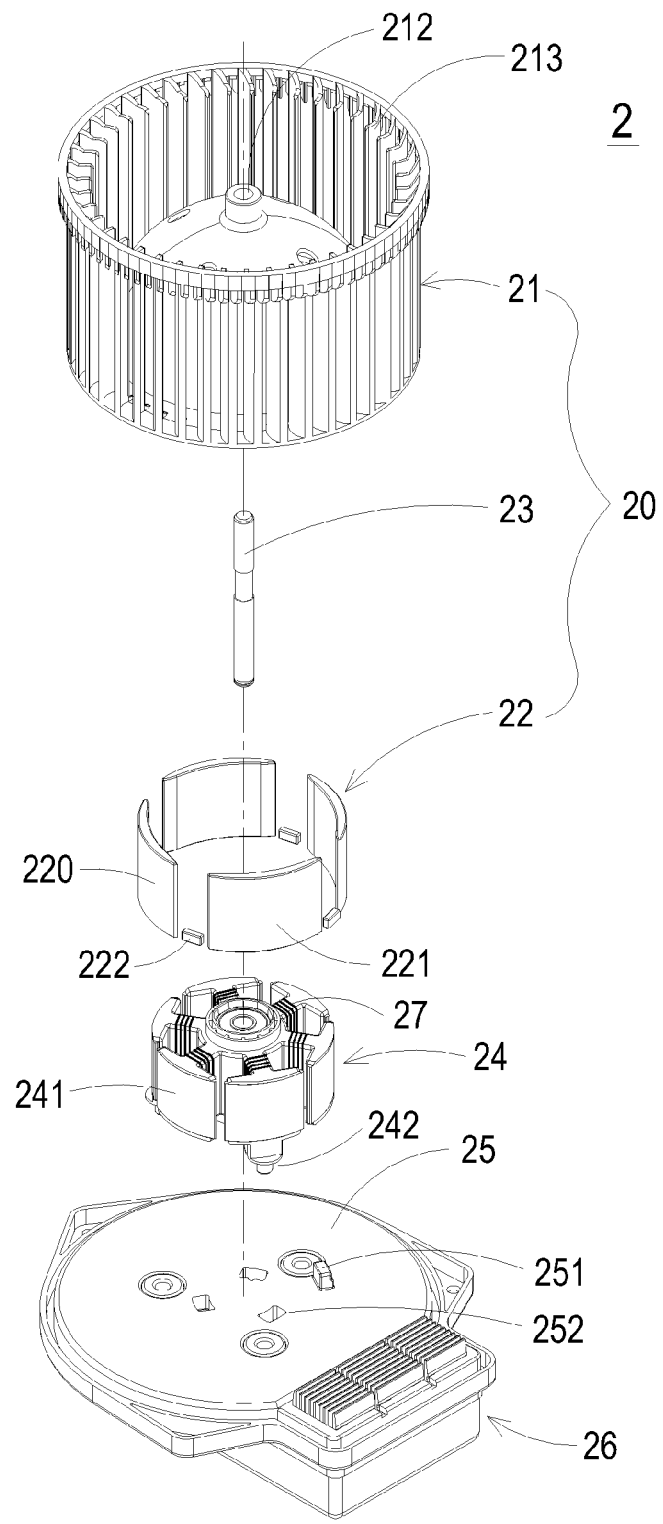
FIG. 2A is a schematic exploded view illustrating a fan according to a first embodiment of the present invention.
Figure 2B:
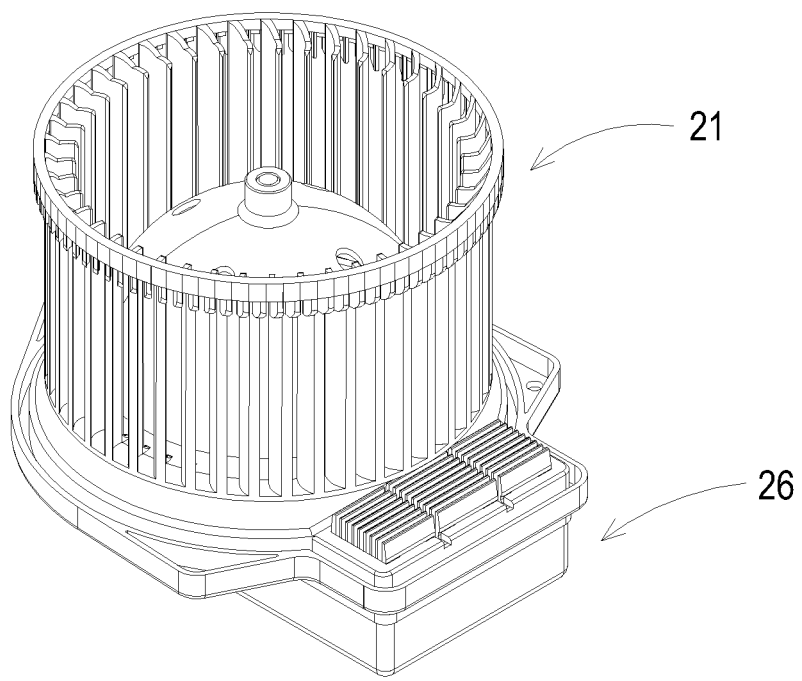
FIG. 2B is a schematic assembled view illustrating the fan of FIG. 2A.

FIG. 2A is a schematic exploded view illustrating a fan according to a first embodiment of the present invention. FIG. 2B is a schematic assembled view illustrating the fan of FIG. 2A. As shown in FIG. 2A, the fan 2 includes a rotor 20, a stator 24, a circuit board 25 and a base plate 26. The rotor 20 includes an impeller 21, a magnetic assembly 22 and a rotating shaft 23. The rotating shaft 23 is extended to the center part of the stator 24. The magnetic assembly 22 includes plural magnets 220, 221, . . . , and so on. These magnets are disposed on the inner periphery of the impeller 21. A pivotal hole 212 is formed in the center part of the impeller 21. The rotating shaft 23 is inserted into the pivotal hole 212. In addition, plural blades 213 are disposed on the outer periphery of the impeller 21. The stator 24 includes plural silicon steel sheets 241 axially surrounding the rotating shaft 23. The circuit board 25 is arranged between the stator 24 and the base plate 26. In addition, a Hall element 251 is disposed on the circuit board 25.

Hereinafter, a process of assembling the fan 2 will be illustrated with reference to FIGS. 2A and 2B. First of all, the magnetic assembly 22 is disposed on the inner periphery of the impeller 21. Then, the rotating shaft 23 is inserted into the pivotal hole 212. Then, the engaging parts 242 of the stator 24 are engaged with corresponding engaging holes 252 of the circuit board 25, so that the stator 24 is combined with the circuit board 25. Meanwhile, the stator 24 is connected with the circuit board 25 and placed on the base plate 26. The circuit board 25 and the base plate 26 can be separate components or integrally formed as a one-piece part. Then, the rotor 20 is disposed around the stator 24. That is, after the magnets 220 and 221 of the magnetic assembly 22 surround the stator 24, the impeller 21 is assembled (see FIG. 2B). After the fan 2 is assembled, the stator 24 and the circuit board 25 are completely sheltered by the impeller 21 of the rotor 20, and connected with the base plate 26.

Please refer to FIG. 2A again. The rotating shaft 23 is inserted into the pivotal hole 212 of the impeller 21 of the rotor 20 and sheathed by the stator 24. The magnets of the magnetic assembly 22 are disposed on the inner periphery of the impeller 21. In this embodiment, the stator 24 is accommodated within a receptacle of the rotor 20. A coil 27 is wound around the silicon steel sheets 241 of the stator 24. The Hall element 251 is mounted on the circuit board 25 and corresponding to the magnetic assembly 22 for detecting the magnetic field change of the magnetic assembly 22. After the fan 2 is turned on, the poles of the magnets of the magnetic assembly 22 are sensed by the Hall element 251, so that a voltage difference is issued to a controlling circuit (not shown) of the circuit board 25. Under control of the controlling circuit, the poles of the silicon steel sheets 241 are switched according to the voltage difference. Consequently, magnetic coupling between the stator 24 and the magnetic assembly 22 of the rotor 20 is created to drive rotation of the rotor 20 of the fan 2.

Figure 3A:
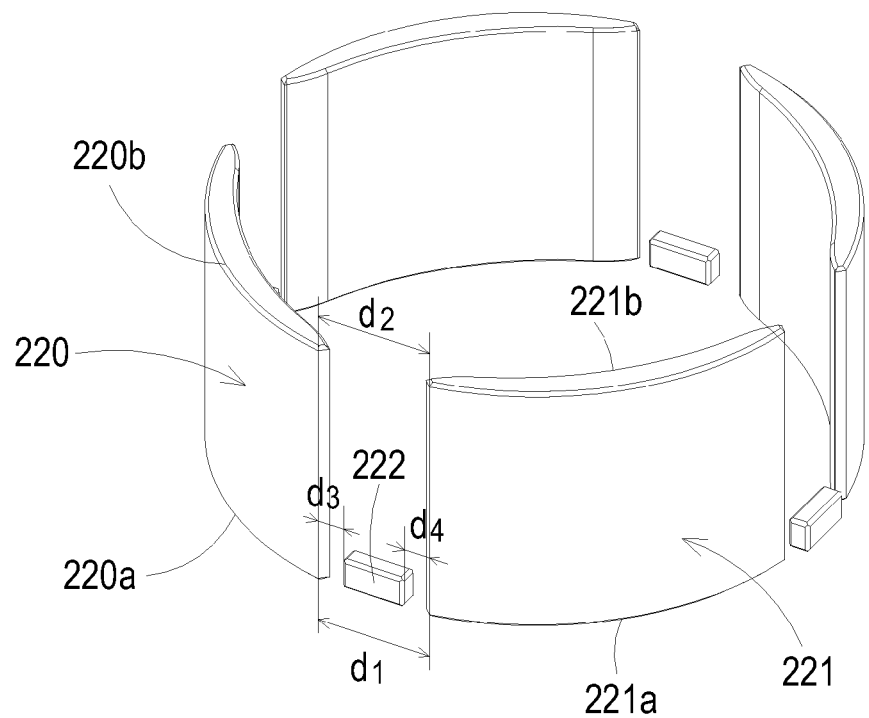
FIG. 3A is a schematic perspective view illustrating a first exemplary magnetic assembly according to the present invention.

FIG. 3A is a schematic perspective view illustrating a first exemplary magnetic assembly according to the present invention. As shown in FIG. 3A, the magnetic assembly 22 includes plural magnets, which have arc-shaped rectangular structures. For clarification and brevity, only two magnets 220 and 221 are illustrated. The magnet 220 has a first edge 220a and a second edge 220b, which are opposed to each other. Similarly, the magnet 221 has a first edge 221a and a second edge 221b, which are opposed to each other. The first edges 220a and 221a are in the vicinity of the circuit board 25, and parallel with the circuit board 25. There is a first gap d1 between the first edge 220a of the magnet 220 and the first edge 221a of the magnet 221. In addition, there is a second gap d2 between the second edge 220b of the magnet 220 and the second edge 221b of the magnet 221. In this embodiment, an auxiliary magnet is arranged between every two adjacent magnets. For example, the auxiliary magnet 222 is disposed within the first gap d1. The auxiliary magnet 222 and the magnets are made of the identical material or different materials. The length of the auxiliary magnet 222 is shorter than the distance of the first gap d1. After the auxiliary magnet 222 is disposed within the first gap d1, the distance of a vacant portion of the first gap d1 is equal to the distance of a vacant portion d3 between the magnet 220 and the auxiliary magnet 222 plus the distance of a vacant portion d4 between the magnet 221 and the auxiliary magnet 222. In accordance with a feature of the present invention, the distance of the vacant portion (i.e. d3+d4) of the first gap d1 is shorter than the distance of the second gap d2. Since the first gap d1 is partially filled with the auxiliary magnet 222, when the magnetic assembly 20 on the circuit board 25 interacts with the Hall element 251, continuous and steady magnetic induction between the Hall element 251 and the magnetic assembly 22 will be achieved. Under this circumstance, the operations of the motor 2 become smoother.

Figure 3B:
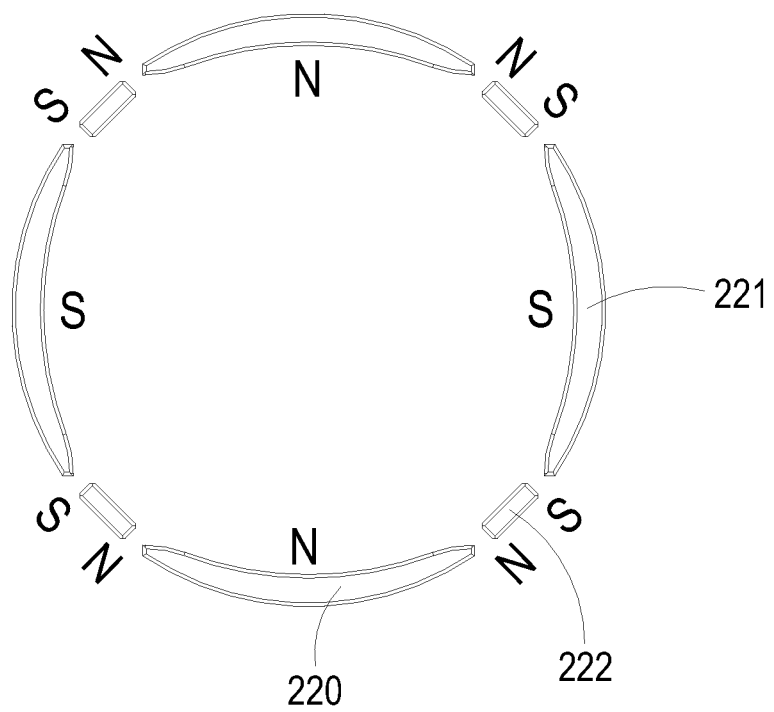
FIG. 3B is a schematic top view illustrating the first exemplary magnetic assembly of FIG. 3A.

FIG. 3B is a schematic top view illustrating the first exemplary magnetic assembly of FIG. 3A. After the magnets of the magnetic assembly 22 are magnetized as alternate N-pole magnets and S-pole magnets, and the auxiliary magnets 222 are magnetized as N/S-pole magnets or S/N-pole magnets according to the poles of the adjacent magnets. For example, the magnet 220 is magnetized as an N-pole magnet, and the magnet 221 is magnetized as an S-pole magnet, and the auxiliary magnet 222 is magnetized as the N/S-pole magnet. Similarly, the auxiliary magnet between the S-pole magnet and the N-pole magnet is magnetized as the S/N-pole magnet. Under this circumstance, the interfaces of the N pole and the S pole of the magnetic assembly 22 are at the auxiliary magnet 222. In such way, since the magnetic field lines of the magnetic assembly 22 become smoother and more complete, the cogging torque of the fan 2 is reduced, and continuous and steady magnetic induction between the Hall element 251 and the magnetic assembly 22 will be achieved. Moreover, since the auxiliary magnet 222 is arranged between the magnets 220 and 222, a single magnetization procedure is sufficient to magnetize the magnetic assembly 22. Under this circumstance, the fabricating process of the fan 2 is simplified.

Figure 4:
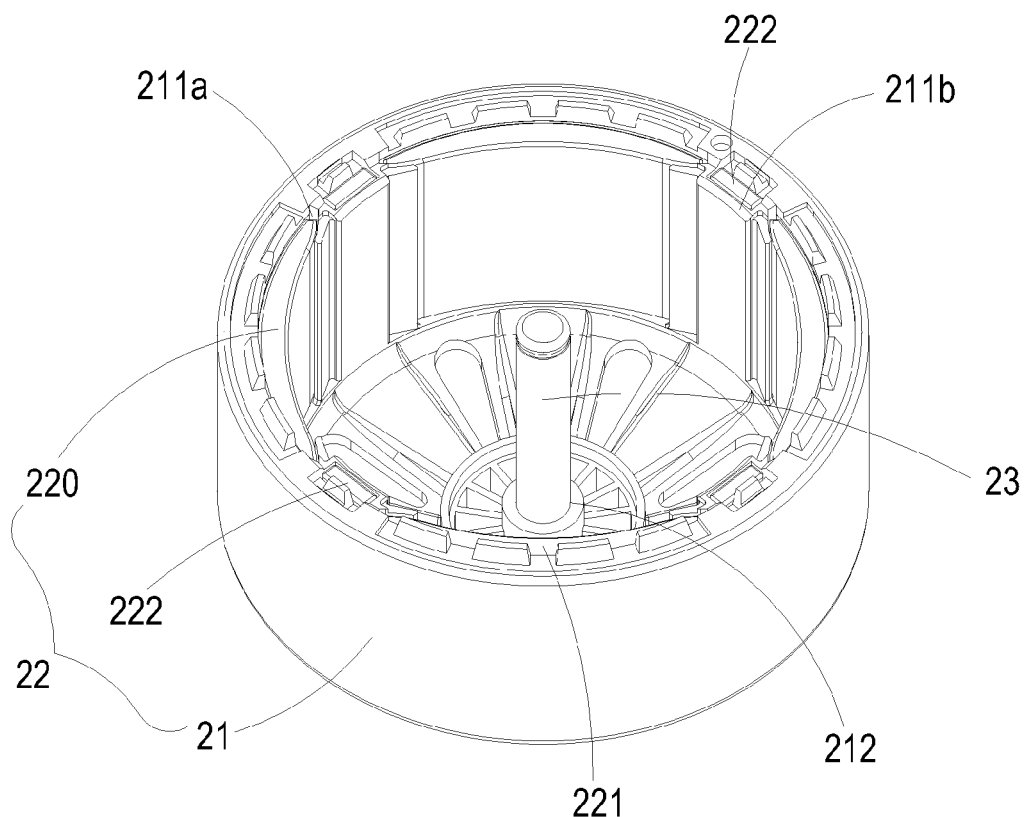
FIG. 4 is a schematic assembled view illustrating the rotor of the fan having the first exemplary magnetic assembly.

FIG. 4 is a schematic assembled view illustrating the rotor of the fan having the first exemplary magnetic assembly. As shown in FIG. 4, the impeller 21 has alternate recesses 211a and 211b, which are formed in the inner surface of the impeller 21. For combining the magnetic assembly 22 and the impeller 21 of the rotor 20, the plural magnets are accommodated within respective recesses 211a, and the plural auxiliary magnets are accommodated within respective recesses 211b. Then, the rotating shaft 23 is inserted into the pivotal hole 212 of the impeller 21. The resulting structure of the rotor 20 is shown in FIG. 4.

Figure 5A:
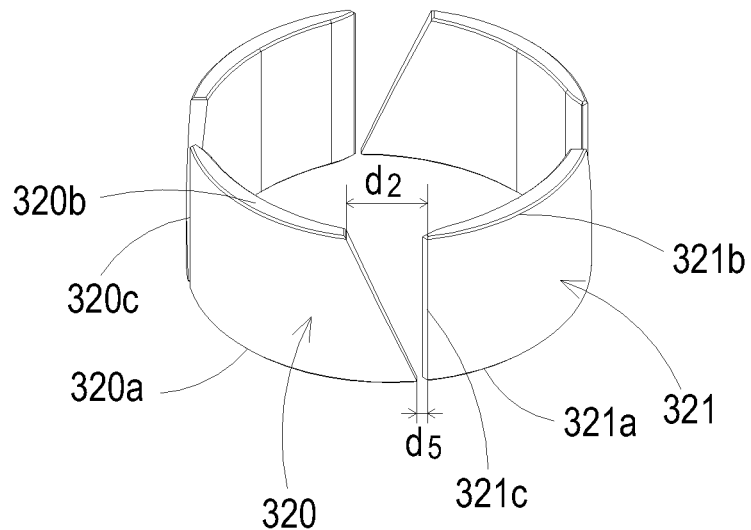
FIG. 5A is a schematic perspective view illustrating a second exemplary magnetic assembly according to the present invention.

FIG. 5A is a schematic perspective view illustrating a second exemplary magnetic assembly according to the present invention. As shown in FIG. 5A, the magnetic assembly 32 includes plural magnets 320, 321, . . . , and so on. These magnets are disposed on the inner periphery of the impeller. In this embodiment, the magnets have arc-shaped trapezoid structures. For clarification and brevity, only two magnets 320 and 321 are illustrated. The magnet 320 has a first edge 320a and a second edge 320b, which are opposed to each other. Similarly, the magnet 321 has a first edge 321a and a second edge 321b, which are opposed to each other. In addition, the third edge 320c of the magnet 320 is substantially perpendicular to the first edge 320a and the second edge 320b; and the third edge 321c of the magnet 321 is substantially perpendicular to first edge 321a and the second edge 321b of the magnet 321. Under this circumstance, the distance of the first gap d5 between the first edge 320a of the magnet 320 and the first edge 321a of the magnet 321 is shorter than the distance of the second gap d2 between the second edge 320b of the magnet 320 and the second edge 321b of the magnet 321. As a consequence, continuous and steady magnetic induction between the Hall element 251 and the magnetic assembly 32 will be achieved.

Figure 5B:
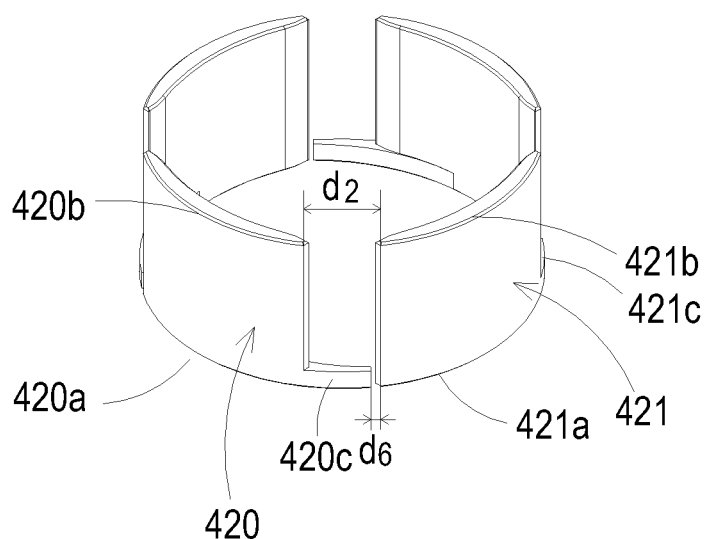
FIG. 5B is a schematic perspective view illustrating a third exemplary magnetic assembly according to the present invention.

FIG. 5B is a schematic perspective view illustrating a third exemplary magnetic assembly according to the present invention. As shown in FIG. 5B, the magnetic assembly 42 includes plural magnets 420, 421, . . . , and so on. These magnets are disposed on the inner periphery of the impeller. For clarification and brevity, only two magnets 420 and 421 are illustrated. The magnet 420 has a first edge 420a and a second edge 420b, which are opposed to each other. Similarly, the magnet 421 has a first edge 421a and a second edge 421b, which are opposed to each other. In addition, a first extension part 420c is extended from the first edge 420a of the magnet 420, and a first extension part 421c is extended from the first edge 421a of the magnet 421. Under this circumstance, the first edge 420a (421a) is longer than the second edge 420b (421b). Consequently, the distance of the first gap d6 between the first edge 420a of the magnet 420 and the first edge 421a of the magnet 421 is shorter than the distance of the second gap d2 between the second edge 420b of the magnet 420 and the second edge 421b of the magnet 421.

Figure 5C:
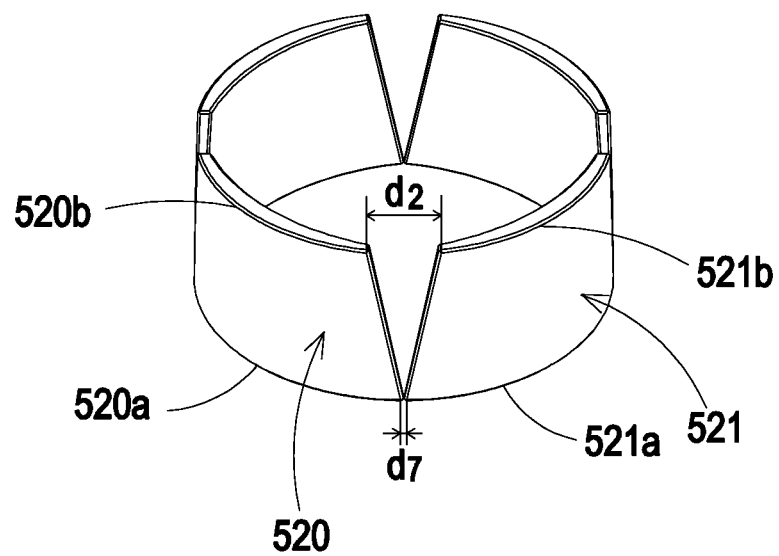
FIG. 5C is a schematic perspective view illustrating a fourth exemplary magnetic assembly according to the present invention.

FIG. 5C is a schematic perspective view illustrating a fourth exemplary magnetic assembly according to the present invention. As shown in FIG. 5C, the magnetic assembly 52 includes plural magnets 520, 521, . . . , and so on. Like the magnetic assembly of FIG. 5A, the magnets have arc-shaped trapezoid structures. For clarification and brevity, only two magnets 520 and 521 are illustrated. The magnet 520 has a first edge 520a and a second edge 520b, which are opposed to each other. Similarly, the magnet 521 has a first edge 521a and a second edge 521b, which are opposed to each other. In this embodiment, the first edge 520a of the magnet 520 is longer than the second edge 520b of the magnet 520, and the first edge 521a of the magnet 521 is longer than the second edge 521b of the magnet 521. Since the first edge 520a of the magnet 520 and the first edge 521a of the magnet 521 are bilaterally extended, the distance of the first gap d7 between the first edge 520a of the magnet 520 and the first edge 521a of the magnet 521 is nearly zero. Since the distance of the first gap d7 is nearly zero, continuous and steady magnetic induction between the Hall element 251 and the magnetic assembly 52 will be achieved.

Figure 5D:
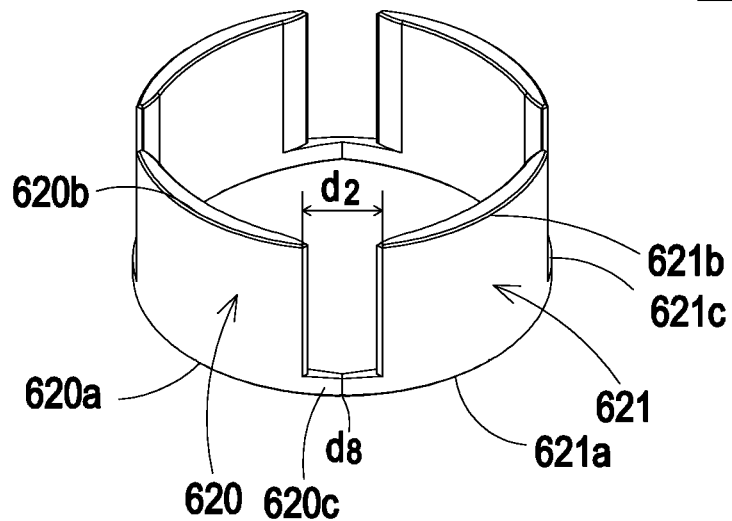
FIG. 5D is a schematic perspective view illustrating a fifth exemplary magnetic assembly according to the present invention.

FIG. 5D is a schematic perspective view illustrating a fifth exemplary magnetic assembly according to the present invention. As shown in FIG. 5D, the magnetic assembly 62 includes plural magnets 620, 621, . . . , and so on. For clarification and brevity, only two magnets 620 and 621 are illustrated. The magnet 620 has a first edge 620a and a second edge 620b, which are opposed to each other. Similarly, the magnet 621 has a first edge 621a and a second edge 621b, which are opposed to each other. In addition, a first extension part 620c is extended from the first edge 620a of the magnet 620, and a first extension part 621c is extended from the first edge 621a of the magnet 621. Since the first extension part 620c of the magnet 620 and the first extension part 621c of the magnet 620 are very close to each other, the distance of the first gap d8 between the magnets 620 and 621 is nearly zero.

In the above embodiments, since the distance of vacant portion of the first gap (d1, d5, d6, d7, d8) is shorter than the distance of the second gap d2, continuous and steady magnetic induction between the Hall element 251 and the magnetic assembly (22, 32, 42, 52, 62) will be achieved. As a consequence, the performance of the fan 2 is enhanced. Moreover, since the second gap d2 of the magnetic assembly (22, 32, 42, 52, 62) is kept unchanged, the waveform of the magnetic field lines of the magnetic assembly is nearly sinusoidal. Under this circumstance, the cogging torque of the fan 2 is decreased, and the noise generated by the fan 2 is reduced.

From the above description, the motor of the brushless fan of the present invention includes a base, a stator, a rotor and a circuit board. The rotor includes an impeller, a rotating shaft and a magnetic assembly. The magnetic assembly includes plural magnets. A first gap and a second gap are arranged between every two adjacent magnets, wherein the first gap is in the vicinity of the Hall element and opposed to the second gap. In addition, the distance of a vacant portion of the first gap is shorter than the distance of the second gap, thereby facilitating continuous and steady magnetic induction between the Hall element and the magnetic assembly. Consequently, the performance of the fan is enhanced. Moreover, since a single magnetization procedure is sufficient to magnetize the magnetic assembly according to the present invention, the fabricating process of the fan is simplified, the fabricating cost is reduced, and the noise generated by the fan is reduced. In other words, the performance of the fan is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A motor of a brushless fan, said motor comprising:
a base plate;
a stator disposed on said base plate;
a rotor disposed around said stator, and comprising an impeller, a rotating shaft and a magnetic assembly, wherein said impeller has plural recesses, said rotating shaft is extended to a center part of said stator, and said magnetic assembly comprises plural magnets, and said plural magnets of said magnetic assembly have arc-shaped rectangular structures; and
a circuit board arranged between said stator and said base plate, and comprising a Hall element;

wherein a first gap is formed between first edges of every two adjacent magnets, said first edges are adjacent and parallel to said circuit board, said first gap is in the vicinity of said Hall element and opposed to a second gap, and an auxiliary magnet is further disposed within said first gap between every two adjacent magnets so that the distance of a vacant portion of said first gap is shorter than the distance of said second gap, thereby facilitating continuous and steady magnetic induction between said Hall element and said magnetic assembly, said plural magnets and said auxiliary magnets are fixed and accommodated within said respective recesses.

2. The motor according to claim 1, wherein the length of said auxiliary magnet is shorter than the distance of said first gap.

3. The motor according to claim 1, wherein if two adjacent magnets are respectively magnetized as an N-pole magnet and an S-pole magnet, said auxiliary magnet between said N-pole magnet and said S-pole magnet is magnetized as an N/S-pole magnet.

4. A fan, comprising:
a base plate;
a stator disposed on said base plate;
a rotor disposed around said stator, and comprising an impeller, a rotating shaft and a magnetic assembly, wherein said impeller has plural recesses, said rotating shaft is extended to a center part of said stator, said magnetic assembly comprises plural magnets fixed and accommodated within said plural recesses, and said magnetic assembly and said stator are sheltered by said impeller; and a circuit board arranged between said stator and said base plate, and comprising a Hall element;
wherein a first gap is formed between first edges of every two adjacent magnets, said first edges are adjacent and parallel to said circuit board, and said first gap is in the vicinity of said Hall element and opposed to a second gap formed between second edges of every two adjacent magnets, and the distance of said first gap is shorter than the distance of said second gap, thereby facilitating continuous and steady magnetic induction between said Hall element and said magnetic assembly.

5. The fan according to claim 4, wherein the distance of said first gap is nearly zero.

6. The fan according to claim 4, wherein said plural magnets of said magnetic assembly have arc-shaped trapezoid structures, and said first edge is longer than said second edge so that the distance of said first gap is shorter than the distance of said second gap.

7. The fan according to claim 4, wherein said first edge of said magnet further includes a first extension part at a lateral side thereof so that the distance of said first gap is shorter than the distance of said second gap.

8. The fan according to claim 4, wherein said first edge of said magnet further includes a first extension part and a second extension part at bilateral sides thereof so that the distance of said first gap is shorter than the distance of said second gap.

9. The fan according to claim 4, wherein said magnet further includes a third edge substantially perpendicular to said first edge and said second edge or inclined with respect to said first edge and said second edge.

* * * * *